United States Patent [19]
Ryntz

[11] Patent Number: 6,166,139
[45] Date of Patent: Dec. 26, 2000

[54] PAINTABLE, SURFACE-DAMAGE RESISTANT COMPOUNDED GRADE THERMOPLASTIC OLEFIN (TPO)

[75] Inventor: Rose Ann Ryntz, Clinton Township, Mich.

[73] Assignee: Visteon Global Technologies, Inc., Dearborn, Mich.

[21] Appl. No.: 09/221,962

[22] Filed: Dec. 28, 1998

[51] Int. Cl.[7] ............................ C08F 8/00; C08L 20/12
[52] U.S. Cl. .................... 525/191; 525/197; 525/240
[58] Field of Search ................................. 525/191, 197, 525/240

[56] References Cited

U.S. PATENT DOCUMENTS

| | | |
|---|---|---|
| 4,521,566 | 6/1985 | Galli et al. . |
| 4,734,459 | 3/1988 | Cecchin et al. . |
| 4,812,526 | 3/1989 | Rifi . |
| 4,950,720 | 8/1990 | Randall, Jr. et al. . |
| 5,331,054 | 7/1994 | Fujita et al. . |
| 5,519,090 | 5/1996 | Schwager et al. . |
| 5,541,260 | 7/1996 | Pelliconi et al. . |
| 5,624,991 | 4/1997 | Harada et al. . |
| 5,641,848 | 6/1997 | Giacobbe et al. . |
| 5,656,374 | 8/1997 | Marzola et al. . |
| 5,681,897 | 10/1997 | Silvis et al. . |

*Primary Examiner*—Nathan M. Nutter
*Attorney, Agent, or Firm*—Charles H. Ellerbrock

[57] ABSTRACT

A painted thermoplastic olefin (TPO) comprising a blend of elastomer and polypropylene. The polypropylene has a number average molecular weight of about 35,000 to about 70,000 and a polypropylene percent crystallinity of about 45 to about 70%. The elastomer has a number average molecular weight of about 20,000 to about 60,000 and an elastomer crystallinity of about 14 to about 60%. The TPO has a polypropylene to elastomer viscosity ratio of about 0.2:1 to about 30:1.

20 Claims, No Drawings

PAINTABLE, SURFACE-DAMAGE RESISTANT COMPOUNDED GRADE THERMOPLASTIC OLEFIN (TPO)

TECHNICAL FIELD

The present invention relates to paintable thermoplastic olefins which comprise a blend of elastomer and polypropylene and which have excellent paint adhesion and resistance to cohesive delamination.

BACKGROUND OF THE INVENTION

Thermoplastic olefins (TPO's), which typically comprise polypropylene and an elastomer, have many desirable properties, e.g., lightweight, durability, low cost, etc., that make them an attractive material of construction for many interior and exterior automotive parts.

Many of the automotive parts manufactured from TPO's are painted to improve the aesthetic quality of the automotive part. For instance, automobile bumpers formed from TPO's are often painted to match the color of the rest of the automobile's exterior paint. Accordingly, it is an object of the present invention to provide TPO's having acceptable paint adhesion.

As the use of painted TPO automotive parts has become more prevalent, it has been observed that painted TPO automotive parts are relatively susceptible to damage known as compressive-shear induced delamination (i.e., gouging) as a result of compressive shear loads acting on the part. An example of such a compressive shear load is a shopping cart impacting an automobile bumper. Accordingly, it is a further object of the present invention to provide TPO's having acceptable paint adhesion and gouge resistance for use in the manufacture of automotive parts.

DISCLOSURE OF THE INVENTION

The present invention achieves the above, and other, objects by providing paintable thermoplastic olefin (TPO's) comprising a blend of elastomer and polypropylene. The polypropylene has a number average molecular weight of about 35,000 to about 70,000, and a percent polypropylene crystallinity of about 45 to about 70%. The elastomer has a number average molecular weight (Mn) of about 20,000 to about 60,000 and a percent elastomer crystallinity of about 14 to about 60%. The TPO has a polypropylene to elastomer viscosity ratio of about 0.2:1 to about 30:1.

The present invention also relates to a method of making a paintable thermoplastic olefin. The method comprises providing polypropylene having a number average molecular weight of about 35,000 to about 70,000, and a percent polypropylene crystallinity of about 45 to about 70%. An elastomer is provided having a number average molecular weight of about 20,000 to about 60,000 and a percent elastomer crystallinity of about 14 to about 60%. The elastomer and the polypropylene are blended together in a reaction vessel to form a thermoplastic olefin having a polypropylene to elastomer viscosity ratio of between about 0.2:1 to about 30:1.

BEST MODE FOR CARRYING OUT THE INVENTION

The present invention relates to paintable thermoplastic olefins (TPO's), and to a method of making paintable thermoplastic olefins.

The thermoplastic olefins of the present invention comprise polypropylene and elastomer. The polypropylene is preferably present in the thermoplastic olefin in an amount of about 65 to about 85% by weight, based on the weight of the thermoplastic olefin. The elastomer is preferably present in the thermoplastic olefin in an amount of about 15 to 35% by weight, based on the weight of the thermoplastic olefin. More preferably, the polypropylene is present in the thermoplastic olefin in an amount of about 65 to about 75% by weight, based on the weight of the thermoplastic olefin, and the elastomer is present in an amount of about 25 to about 35% by weight, based on the weight of the thermoplastic olefin. Most preferably, the polypropylene is present in the thermoplastic olefin in an amount of about 70% by weight, based on the weight of the thermoplastic olefin, and the elastomer is present in an amount of about 30% by weight, based on the weight of the thermoplastic olefin.

The polypropylene preferably has a number average (Mn) molecular weight of about 35,000 to about 70,000, and more preferably of about 45,000 to about 70,000. The use of polypropylene having molecular weights below about 35,000 may, among other things, result in thermoplastic olefins having unacceptably low tensile strength. The use of polypropylene having molecular weights above about 70,000 may, among other things, result in thermoplastic olefins having unacceptably high polypropylene to elastomer viscosity ratios.

Preferably, the polypropylene has a molecular weight distribution (Mw/Mn) of about 2 to about 4, and more preferably, of about 2.5 to about 3.5. The molecular weight distribution (Mw/Mn) is a value obtainable by gel permeation chromatography. The polypropylene has a relatively narrow molecular weight distribution because it, among other things, affords optimum dispersibility with the elastomers.

The polypropylene preferably has a percent crystallinity of between about 45 to about 70%, more preferably of about 45 to about 55%, and most preferably from about 46 to about 47%. The percent crystallinity of the polypropylene is a value measurable on a differential scanning calorimeter. If the percent crystallinity of the polypropylene exceeds about 70%, the resulting thermoplastic olefin may not, among other things, have acceptable paint adhesion performance. Using a polypropylene having a percent crystallinity below about 45% may, among other things, result in a thermoplastic olefin having unacceptable gouge characteristics.

Examples of polypropylenes useable in the present invention include, but are not limited to, Exxon Chemical Company's Escorene 1042, which has a density of about 0.905 grams/cm$^3$, a melt flow rate of about 1.9 dg/10 min., a Mn of approximately 67,070, a Mw/Mn equal to about 3.51, a percent crystallinity of about 46, and a flexural modulus equal to about 1,240 MPA, and Escorene 1105, which has a density of about 0.906 g/cm$^2$, a melt flow rate equal to about 34 dg/10 min., a Mn of approximately 48,021, a Mw/Mn equal to about 2.58, a percent crystallinity of about 47, and a flexural modulus of about 1,170 MPA.

The polypropylene may alternatively be an impact-copolymer (ICP) consisting essentially of polyethylene and polypropylene. If impact copolymer is substituted for the polypropylene, the impact copolymer preferably has a percent crystallinity range, molecular weight range, and molecular weight distribution (Mw/Mn) range which are the same as the ranges described above for the polypropylene homopolymer.

Suitable elastomers for use with the present invention include, but are not limited to, copolymers of ethylene and other polyolefins, such as propylene, butene, hexene, or octene.

The number average molecular weight of the elastomer is preferably between about 20,000 to about 60,000, and most preferably between about 23,000 to about 45,000. Problems with the use of elastomers outside of this molecular weight range may include, among other things, thermoplastic olefins having unacceptably low tensile strength and unacceptably high polypropylene to elastomer viscosity ratios.

Preferably, the elastomer has a molecular weight distribution (Mw/Mn) of about 1.75 to about 5, and more preferably, of about 2 to about 3. The elastomer has a relatively narrow molecular weight distribution because it, among other things, affords optimum dispersion characteristics with the polypropylene.

The elastomer preferably has a percent crystallinity of between about 14 to about 60%, more preferably of about 30 to about 50%, and most preferably from about 40 to about 50%. If the percent crystallinity of the elastomer exceeds about 60%, the resulting thermoplastic olefin may have, among other things, unacceptable paintability characteristics. Using an elastomer having a percent crystallinity below about 14% may result in a thermoplastic olefin having, among other things, unacceptable gouge characteristics.

Examples of suitable elastomers include but are not limited to ethylene-butene copolymers from the Exxon Chemical Company of Houston, Tex., designated as Exact 4033, Exact 3022, and Exact 3125. Exact 4033 has a density of about 0.92 g/cm$^2$, a melt flow rate of about 1.3 dg/10 Min., a number average molecular weight of about 50,500, a Mw/Mn of about 1.96, and a percent crystallinity of about 15%. Exact 3022 has a density of about 0.92 g/cm$^2$, a melt flow rate of about 9 dg/10 Min., a number average molecular weight of about 23,000, a Mw/Mn of about 2.63, and a percent crystallinity of about 39%. Exact 3125 has a density of about 0.92 g/cm$^2$, a melt flow rate of about 1.2 dg/10 Min., a number average molecular weight of about 45,500, a Mw/Mn of about 1.96, and a percent crystallinity of about 46%.

The viscosity ratio of polypropylene to elastomer in the thermoplastic olefin is preferably between about 0.2:1 to 30:1, more preferably between about 1:1 to about 15:1, even more preferably between about 1:1 to about 4:1, and most preferably about 1:1 to about 2:1. The viscosity ratio is measurable via ASTM D-1238 Condition E or ASTM D-1238 Condition N. Thermoplastic olefins having a viscosity ratio of polypropylene to elastomer less than about 1:1 may be disadvantageous because, among other things, the elastomer forms domains which are unacceptably too large. Thermoplastic olefins having a viscosity ratio of polypropylene to elastomer greater than about 30:1 may be disadvantageous because, among other things, the elastomer forms domains which are unacceptably too small.

As would be apparent to those skilled in the art of making plastic materials, in addition to elastomer and polypropylene, the thermoplastic olefin of the present invention may include other additives such as stabilizers. Other conventional additives include but are not limited to, antioxidants such as sterically hindered phenols, phosphites, phosphonites, sterically hindered amine light stabilizers, and ultraviolet light absorbers. Additionally, the addition of internal mold release agents such as metal stearates, fatty and wax acids, amides, or esterified polyol esters and lubricants such as thioesters, a low molecular weight olefinic waxes, glycerol monostearate or ethyoxylated fatty amines may be used as processing aids.

The thermoplastic olefins of the present invention are preferably prepared by blending, or compounding, the components in a kneading apparatus such as a single or twin screw extruder, Banbury mixer, or hot rollers. The processing parameters and the use of such kneading apparatuses are well known to those skilled in the art. Preferably, the thermoplastic olefin components are blended (i.e., melt mixed) in a Banbury mixer and is then transferred to a Warner-Pfliderer twin screw extruder and extruded into strands or pellets.

The extruded TPO's can then be formed into components, such as automotive components, by known methods, such as, injection molding, blow molding, compression molding, an extrusion molding. The TPO components may then be painted by any conventional known methods and with any conventional paint system.

The following examples are meant to describe preferred embodiments of the present invention.

EXAMPLE I

Into a Banbury mixer is added 30 parts Exact 4033 (ethylene-butene), available Exxon Chemical Co., Houston, Tex. and 70 parts ESCORENE 1105 (available Exxon Chemical Co.) polypropylene. The two polymers are melt mixed to produce a blend which is then added to a Werner-Pfliderer twin screw extruder, extruded to a fine strand, and water cooled and cut into fine pellets. The pellets are injection molded into 4"×12"×32 mm thick plaques. The plaques are painted with commercially available adhesion promotor (solvent based chlorinated polyolefin), one component melamine crosslinked basecoat, two component isocyanate crosslinked clearcoat. Spray application, via air atomization, accomplishes dry film thicknesses of the solvent based paints of 7.5 microns adhesion promoter, 37 microns white basecoat, and 37 microns clearcoat. Baking is accomplished for 30 minutes at 121° C. Film application is wet-on-wet-on-wet.

EXAMPLE II

Into a twin screw extruder are admixed 75 parts Escorene 1042 pp and 25 parts Exact 3125. The two polymers are melt extruded into pellets (after water cooled chopping) and molded and painted as described in Example I.

EXAMPLE III

As in Example II, substituting 70 parts Escorene 1105 and 30 parts Exact 3022.

EXAMPLE IV

As in Example I, substituting Escorene 1042 70 parts and 30 parts 3022.

EXAMPLE V

A prior art sample of Dexflex 161B, commercially available from Solvay Engineered Polymers, Grand Prarie, Tex., is painted as in Example I. Dexflex 161B comprises 70% polypropylene and 30% elastomer. The polypropylene has a number average molecular weight of about 60,000, a molecular weight distribution of about 5, a % crystallinity of about 90%, and a melt flow rate of about 15 dg/10 min. The elastomer has a number average molecular weight of about 30,000, a molecular weight distribution of about 4, a % crystallinity of about 5%, and a melt flow rate of about 8 dg/10 min. The viscosity ratio of polypropylene to elastomer for the Dexflex 161B is about 1.9.

EXAMPLE VI

As in Example I, substituting 70 parts Mitsubishi Petrochemical MH-4 polypropylene and 30 parts Exact 3125. The MH-4 is available from Mitsubishi Petrochemical and has a Mn of about 60,000, a Mw/Mn of about 6.2, a % crystallinity of about 90%, and a melt flow rate of about 2–3 dg/10 min.

Gasoline soak and friction induced paint damage (FIPD) were tested on each of the painted specimens from Examples I–VI.

FIPD measures cohesive delamination (gouge) as a result of compressive shear force and is measured in accordance with Ford protocol as follows. A painted substrate from Examples I–VI is mounted on a slidable member. A cylindrical steel member having a polyamide member secured to an end of the steel member is placed on the substrate so that the polyamide member abuts the substrate. A load of about 600 lbs. is applied to the steel member. The slidable member is slid about 4" in one direction at a velocity of 0.875 in/sec. The area of damage (FIPD) is measured. This is repeated for each of the substrates of Examples I–VI. The results are shown in Table I.

Gas soak measures paint adhesion and is measured in accordance with Ford protocol as follows. 100 uniform squares are etched in the painted surface of a painted substrate from Examples I–VI. The substrate is submerged in CE-10 (10% ethanol, 90% 50/50 w/w isooctane/toluene) for about 15 minutes. The % of the squares which release from the substrate is determined. This is repeated for each of the substrates of Examples I–VI. The results are shown in Table I.

TABLE I

| RESULTS | EXAMPLE # | | | | | |
| --- | --- | --- | --- | --- | --- | --- |
|  | I | II | III | IV | V | VI |
| Gas soak (% removed, 15 min) | 0 | 10 | 0 | 0 | 25 | 55 |
| FIPD (area of damage, mm$^2$) | 20 | 0 | 5 | 0 | 70 | 20 |

As can be seen from the above examples, the thermoplastic olefins of the present invention have improved paint adhesion (as shown by the gas soak test) and gouge resistance (as shown by the FIPD test), with respect to the prior art TPO's.

While the best modes for carrying out the invention have been described in detail, those familiar with the art to which this invention relates will recognize various alternative designs and embodiments for practicing the invention as defined by the following claims.

What is claimed is:

1. A paintable thermoplastic olefin (TPO) comprising: a blend of elastomer and polypropylene, the polypropylene having a number average molecular weight of about 35,000 to about 70,000 and a polypropylene percent crystallinity of about 45 to about 70%, the elastomer having a number average molecular weight of about 20,000 to about 60,000, the elastomer having an elastomer crystallinity of about 14 to about 60%, the TPO having a polypropylene to elastomer viscosity ratio of about 0.2:1 to about 30:1.

2. The paintable TPO of claim 1 wherein the elastomer is present in an amount of about 15 to 35 weight percent based on the weight of the TPO.

3. The paintable TPO of claim 2 wherein the polypropylene is present in an amount of about 65 to 85% by weight, based on the weight of the TPO.

4. The paintable TPO of claim 3 wherein the polypropylene has a molecular weight distribution (Mw/Mn) of about 2 to about 4.

5. The paintable TPO of claim 4 wherein the polypropylene has a percent crystallinity of about 45 to about 55%.

6. The paintable TPO of claim 5 wherein the elastomer has a molecular weight distribution (Mw/Mn) of about 1.75 to about 5.

7. The paintable TPO of claim 6 wherein the elastomer has a percent crystallinity of about 30 to about 50%.

8. The paintable TPO of claim 1 wherein the TPO has a polypropylene to elastomer viscosity ratio of about 1:1 to about 4:1.

9. The paintable TPO of claim 8 wherein the elastomer comprises polypropylene and polyethylene.

10. The paintable TPO of claim 1 wherein the TPO consists essentially of the polypropylene and the elastomer.

11. A paintable automobile bumper formed of the TPO of claim 1.

12. A method of making a paintable thermoplastic olefin (TPO), the method comprising:
providing polypropylene having a number average molecular weight of about 35,000 to about 70,000 and a polypropylene percent crystallinity of about 45 to about 70%;
providing elastomer having a number average molecular weight of about 20,000 to about 60,000, the elastomer having a percent elastomer crystallinity of about 14 to about 60%;
compounding the elastomer and the polypropylene in a vessel to form the TPO, the TPO having a viscosity ratio of propylene to elastomer between about 0.2:1 to about 30:1.

13. The method of claim 12 wherein the elastomer is present in an amount of about 15 to 35 weight percent, based on the weight of the TPO and the polypropylene is present in an amount of about 65 to 85% by weight, based on the weight of the TPO.

14. The method of claim 13 wherein the polypropylene has a molecular weight distribution (Mw/Mn) of about 2 to about 4.

15. The method of claim 14 wherein the polypropylene has a percent crystallinity of about 45 to about 55%.

16. The method of claim 15 wherein the elastomer has a molecular weight distribution (Mw/Mn) of about 1.75 to about 5.

17. The method of claim 16 wherein the elastomer has a percent crystallinity of about 30 to about 50%.

18. The method of claim 12 wherein the TPO has a polypropylene to elastomer viscosity ratio of about 1:1 to about 4:1.

19. The method of claim 12 wherein the paintable TPO has a layer of paint adhered thereto.

20. The method of claim 12 wherein the TPO has a layer of paint adhered thereto.

* * * * *